United States Patent
Eckstein

(10) Patent No.: US 8,176,763 B2
(45) Date of Patent: May 15, 2012

(54) STEERING RACK

(75) Inventor: Ralf Eckstein, Feldkirch (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 201 days.

(21) Appl. No.: 12/457,787

(22) Filed: Jun. 22, 2009

(65) Prior Publication Data

US 2009/0301245 A1 Dec. 10, 2009

Related U.S. Application Data

(63) Continuation of application No. PCT/AT2007/000546, filed on Dec. 5, 2007.

(30) Foreign Application Priority Data

Dec. 22, 2006 (DE) .................. 10 2006 062 241

(51) Int. Cl.
*B21C 37/06* (2006.01)

(52) U.S. Cl. ........... 72/368; 72/51; 72/370.2; 72/370.21

(58) Field of Classification Search ........... 72/51, 367.1, 72/368, 370.01, 370.04, 370.19, 370.2, 370.21; 29/893.3, 893.34; 74/422
See application file for complete search history.

(56) References Cited

U.S. PATENT DOCUMENTS

| | | | |
|---|---|---|---|
| 3,163,925 A | 1/1965 | Ulm et al. | |
| 4,133,221 A | 1/1979 | Clary | |
| 4,149,399 A * | 4/1979 | Persson et al. | 72/368 |
| 4,466,267 A * | 8/1984 | Casler et al. | 72/368 |
| 5,473,960 A | 12/1995 | Sakamoto et al. | |
| 6,317,979 B1 * | 11/2001 | Yamawaki | 29/893.34 |
| 6,442,992 B2 | 9/2002 | Tsubouchi et al. | |
| 6,502,473 B1 | 1/2003 | Akiyama et al. | |
| 6,588,293 B2 | 7/2003 | Tsubouchi et al. | |
| 6,588,297 B1 | 7/2003 | Day et al. | |
| 6,718,813 B2 | 4/2004 | Yasuda et al. | |
| 6,763,739 B2 | 7/2004 | Tsubouchi et al. | |
| 6,779,271 B2 | 8/2004 | Tsubouchi et al. | |
| 6,782,772 B2 * | 8/2004 | Tsubouchi et al. | 74/422 |
| 6,845,560 B2 | 1/2005 | Tsubouchi et al. | |

(Continued)

FOREIGN PATENT DOCUMENTS

DE 1 225 589 9/1966

(Continued)

OTHER PUBLICATIONS

International Search Report issued Apr. 25, 2008 in the International (PCT) Application of which the present application is the U.S. National Stage.

(Continued)

*Primary Examiner* — Edward Tolan
(74) *Attorney, Agent, or Firm* — Wenderoth, Lind & Ponack, L.L.P.

(57) ABSTRACT

A toothed rack has hollow sections and a longitudinal axis that extends parallel to a longitudinal direction and which in the hollow region includes a wall encompassing the longitudinal axis of the toothed rack in a circumferential direction and in at least a subregion comprises a toothing. In the circumferential direction spaced apart from the toothing, at least one local attenuation and/or holding edge is developed in the wall, which, with respect to the longitudinal direction of the toothed rack, extends at least over a portion of the length of the toothing next to the attenuation.

9 Claims, 5 Drawing Sheets

U.S. PATENT DOCUMENTS 7,134,456 B2 * 11/2006 Maeda et al. ............... 138/156
7,225,541 B2 * 6/2007 Kubota .................... 29/897.2

FOREIGN PATENT DOCUMENTS

| EP | 1 092 610 | 4/2001 |
| EP | 1 123 855 | 8/2001 |
| EP | 1 132 277 | 9/2001 |
| EP | 1 145 934 | 10/2001 |
| JP | 59-137145 | 8/1984 |
| JP | 9-175412 | 7/1997 |
| JP | 10-85884 | 4/1998 |
| JP | 11-180318 | 7/1999 |
| JP | 11-278287 | 10/1999 |
| JP | 3633253 | 3/2005 |
| WO | 2006/099661 | 9/2006 |

OTHER PUBLICATIONS

Lange, Kurt, *Forming Technique, Handbook for Industry and Science*, vol. 1 (1984), pp. 140-145 (with English translation).

* cited by examiner

STEERING RACK

This is a continuation application of International application PCT/AT2007/000546, filed Dec. 5, 2007, the entire disclosure of which is hereby incorporated by reference.

BACKGROUND OF THE INVENTION a) Field of the Invention

The invention relates to a toothed rack which at least in sections is hollow and whose longitudinal axis extends parallel to a longitudinal direction and which in its hollow region includes a wall, which wall encompasses the longitudinal axis of the toothed rack in a circumferential direction and which in at least a subregion has teeth. The invention furthermore relates to a method for the production of a hollow section of a toothed rack or a hollow toothed rack out of a planar metal sheet. A longitudinal axis of the hollow section of the toothed rack extends parallel to a longitudinal direction and the hollow section of the toothed rack includes a wall which encompasses the longitudinal axis of the toothed rack in a circumferential direction and in at least a subregion has teeth.

The planar metal sheet is reformed in a first forming die into a half-shell form or U-form, comprising two shanks connected with one another by a connection section and each having an end remote from the connection section subsequently, simultaneously, or previously the teeth are pressed into the sheet metal. After the forming of the planar metal sheet in a first forming die into a half-shell form or U-form, in one or several subsequent forming steps, the ends of the two shanks are bent together with the formation of a hollow volume extending in the direction of the longitudinal axis.

b) Description of Related Prior Art

Toothed racks are employed, for example, in steering systems of motor vehicles for the conversion of a rotational motion into a translational motion. For this purpose, a pinion, which in the way of an example is directly or indirectly driven by a steering wheel of a steering system, engages into the toothing of a toothed rack. By changing the tooth engagement, through a turning of the pinion, the toothed rack, which is appropriately supported, is displaced in one of its longitudinal directions depending on the direction of the turning. The toothed rack subsequently drives, for example, tie rods and therewith effects the directional deviation of the wheels of the motor vehicle.

The production of the toothed rack, in particular for use in a steering system, is highly complex and expensive due to the high requirements made of strength and precision. It is especially important to obtain as precisely defined a tooth geometry as possible and high tooth strength. There are a number of methods found within prior art with which toothed racks through forming or machining methods and appropriate finishing steps can be fabricated. However, such toothed racks are often very heavy and entail correspondingly high material costs.

JP 11-180318 A introduces a method for the production of a hollow toothed rack from a planar metal sheet, in which in a first step the metal sheet is curved into a U-form, wherein the connection section between two U-shanks is formed semicircularly. The toothing (teeth) is subsequently pressed into the apex of the curvature of the connection section, and the shank is curved to form a closed tubular profile.

In an alternative embodiment of the JP 11-180318 A, the toothing is initially pressed into the planar metal sheet. The regions of the metal sheet adjacent to the toothing are subsequently curved to form a closed tube.

In both embodiments, the shanks of the U-profile are of unequal length and the longer of the two shanks is formed to yield the closed tube profile. However, in both embodiments the tooth shape cannot be produced with high precision. The bending operations introduce stresses into the region of the toothing, which leads to the shape distortion of the toothing. The unequal length of the shanks does little to alter this fact.

U.S. Pat. No. 6,845,560 B2 also introduces the production of a toothed rack from a planar metal sheet. Here, the metal sheet is bent over into a U-profile with two side leg shanks and one connection piece. In the connection piece, one region is shaped such that it is planar and two regions adjacent thereon on both sides are formed semicircularly. This semicircular region next to the planar region is additionally formed with increasing gradient with progressively greater distance. Following this forming, in a second step the toothing is pressed into the planar region and in a third step the side shanks are bent together into a tube.

In this example, in the forming following the pressing-in of the toothing, stresses are also introduced into the toothing which lead to shape distortion. The specifically increasing gradient form of the semicircular connection section next to the planar region, into which the toothing is subsequently pressed, does not suffice to avoid such stresses.

EP 1 123 855 proposes for the production of a toothed rack to provide the male die part, engaging on the inner face of the hollow region of the wall of the toothed rack, with lateral projections. These serve for pushing material into the region of the toothing during the forming process. On the other hand, U.S. Pat. No. 3,163,925 for the production of a toothed rack provides accepting a thinning of the material in the region of the toothing.

SUMMARY OF THE INVENTION

The invention addresses the problem of providing a toothed rack developed from a planar piece of metal sheet by forming the planar piece of metal sheet, which toothed rack has a highly precise tooth form at low production complexity and expenditure. Further, a method for the production of a toothed rack will be provided in which after the forming a very high precision of the toothing is already attained.

The problem is resolved by a toothed rack in which is developed in the circumferential direction spaced apart from the toothing (teeth) at least one local attenuation or holding edge, or at least one local attenuation and holding edge in the wall, which, with reference to the longitudinal direction of the toothed rack, extends over a portion of the length of the toothing next to same.

In a method according to the invention for the production of a toothed rack is provided that into the sheet metal one or several attenuations or holding edges or one or several attenuations and holding edges are formed in, spaced apart in the circumferential direction from the toothing already introduced or still to be introduced, which [attenuations or holding edges] extend with reference to the longitudinal direction of the toothed rack at least over a portion of the length of the already introduced toothing or yet to be introduced next to these.

The core concept of the invention is that through the attenuations and/or holding edges appropriately introduced into the sheet metal, the stress distribution introduced into the sheet metal through the subsequent forming steps can be affected. Thus, for example, bending stresses are transmitted only to a minor extent across attenuations, for example beads or also milled recesses extending transversely to the bending line. At least the major portion of the stress is degraded through shape deformation at the site of the attenuation. On holding edges the material flow is inhibited through the contact with the die. Accordingly, a stress introduced on the one side of the holding edge with the shape deformation resulting therefrom can only to a small extent be transferred further to the other side of the holding edge.

With the disposition of such an attenuated site and/or holding edge on a margin of a subregion of the piece of metal sheet to be formed, accordingly, only a minor portion of the stresses, which are introduced into the workpiece in a subsequent forming of the region adjacent to the subregion and located on the other side of the attenuation or holding edge, is introduced into this subregion. Thereby in narrowly toleranced contours, in particular toothings which had previously been worked into the subregion, additional stresses and corresponding form changes are largely prevented from being effected through the subsequent forming of the region of the metal sheet, delimited from the subregion by the at least one attenuation and/or holding edge.

It should be noted that such precise, formed toothings are also of advantage in the case of subsequent grinding operation.

The subregion including the toothing consequently represents a region that, as much as possible, is unaffected by the action of the subsequent forming. The subregion corresponds in its dimensions at least to the toothing region.

It is preferred if not only at least one but rather all provided attenuations and/or holding edges are spaced apart from the toothing, thus have a distance greater than 0 (referred to the circumferential direction). Thus there is no attenuation and/or holding edge provided which is disposed without spacing from the toothing or within such toothing or beneath it (in the case of the disposition on the opposite inner face of the wall of the workpiece).

In an advantageous embodiment of the invention, at least one attenuation and/or holding edge extends, with reference to the circumferential direction, in front of and behind the subregion or the toothing, thus viewed in the longitudinal direction, on both sides of the subregion or of the toothing. For example, bilaterally to the subregion precisely one attenuation each or one holding edge could be provided.

For the disposition and layout of such attenuation sites, the subsequently planned forming operations are advantageously taken into consideration. For this purpose, numerical simulations (FEM simulations) can be considered in which the stress distributions in the structural part are simulated and therewith the correct disposition and layout of the attenuation sites can be determined. The attenuation sites are basically to be laid out such that the stresses introduced outside of the subregion, such as in particular bending stresses, can be degraded at the attenuation site. This means that, as a rule, the attenuation sites delimit partially or completely the subregion to be protected.

If through the formation of the attenuations additional shoulders or edges are worked into the workpieces, the material flow is strongly reduced through the placing of the corresponding shoulders or edges on the die. The attenuations in this case form thus simultaneously also holding edges. Thereby the introduction of stresses into the subregion, which is delimited through the attenuations, is additionally further reduced. In a further development of the invention, accordingly, at least one holding edge is formed as an attenuation.

Conceivable and feasible would also be, for example, forming holding edges which do not also simultaneously represent an attenuation. Compared to holding edges, attenuations can inter alia be advantageous in the sense that a contact with the die at the site of the attenuation during the forming is not required in order to avoid undesirable shape deformations in the subregion including the toothing. In the case of a holding edge, contact with the die is required.

The at least one holding edge is consequently utilized to affect stresses which occur during the processes required in the production of the toothed rack.

In the formation of a toothed rack from a piece of metal sheet a toothing is worked as a specific contour into a subregion, wherein, preferably already before the toothing is worked in, at least one preceding forming has been completed. In the following, the piece of metal sheet is formed into the shape of the finished toothed rack, wherein the particular worked-in attenuation and/or holding edge counteracts a further uncontrolled shape deformation. The subregion in which is located the toothing, herein in reference to the direction of the bending line of the piece of metal sheet during the bending operation, which takes place for the formation of the toothed rack form, is preferably delimited bilaterally by at least one attenuation and/or holding edge, wherein this attenuation or holding edge extends transversely, preferably orthogonally, to the bending line.

The attenuations and/or holding edges are preferably developed line shaped. The line-shaped contour can herein be a straight line. A line-shaped contour including segments having curvatures or being disposed at angles to one another are also conceivable and feasible. Furthermore, discontinuities of the attenuations and/or holding edges in the line-shaped contour are conceivable and feasible.

In the following the invention will be explained by example in conjunction with schematic Figures.

DETAILED DESCRIPTION OF THE PREFERRED EMBODIMENTS

All Figures serve only to illustrate the invention. In particular the die geometries and/or the proportions are only shown schematically.

Figure 6:
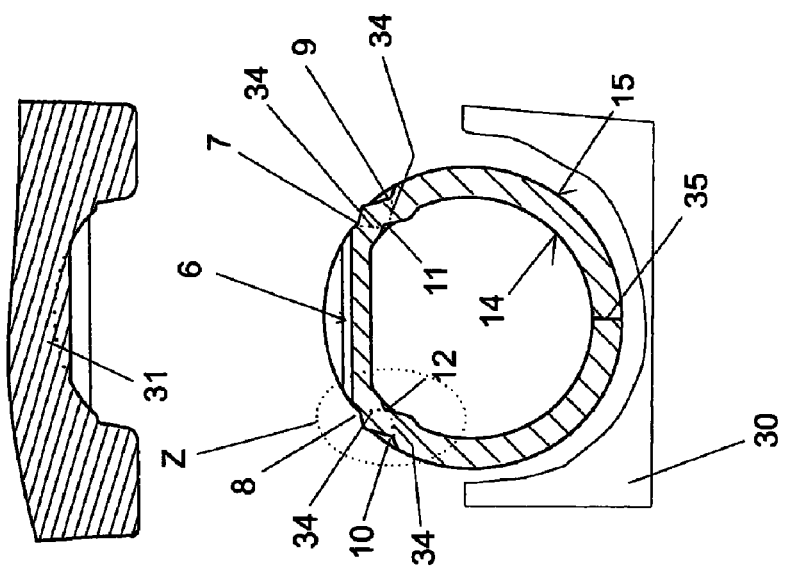
FIG. 6 shows an embodiment of the completed formed toothed rack in the die, corresponding to FIG. 1, shown in cross section.
Figure 5:
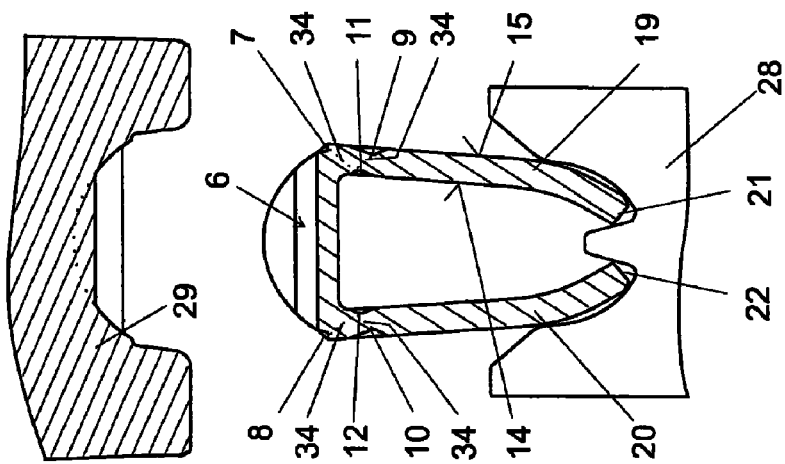
FIG. 5 shows a feasible third forming stage for the production of the toothed rack, shown in cross section.

For better clarity, the dies in FIGS. 5 and 6 are shown drawn apart and the sections are partially not hatched.

Figure 1:
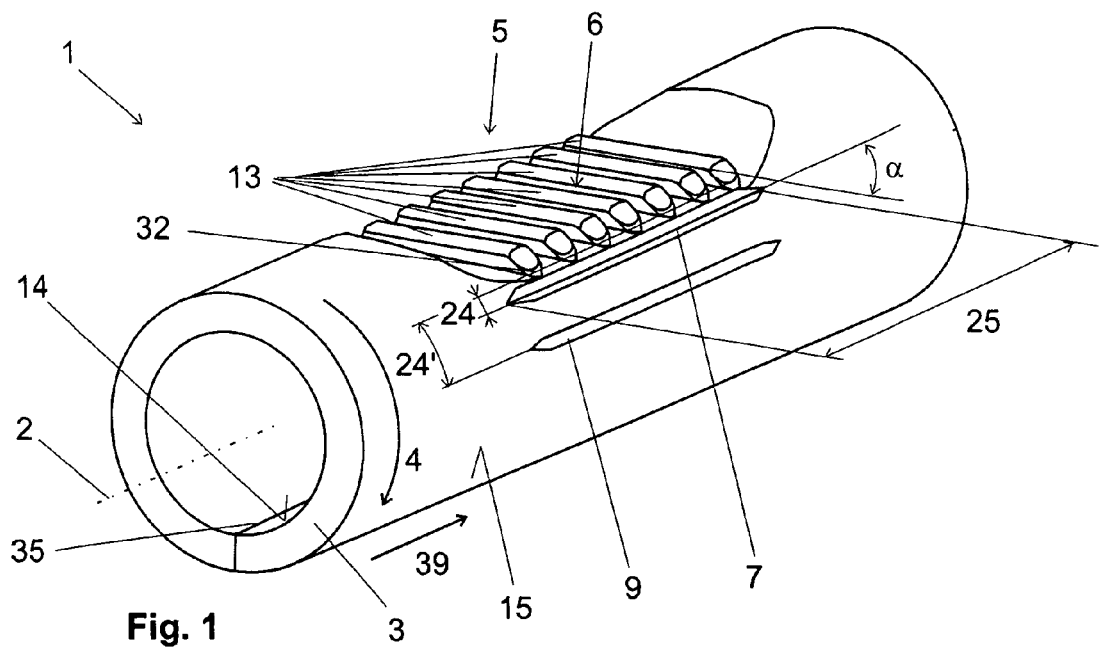
FIG. 1 shows an embodiment of the toothed rack according to the invention.
Figure 2:
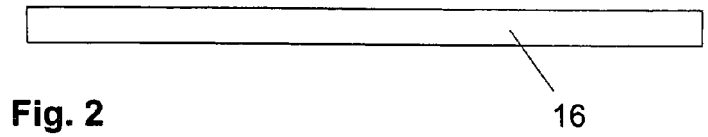
FIG. 2 shows the starting workpiece, the planar sheet metal blank, for the production of the toothed rack.

FIG. 1 depicts a segment of an embodiment of the toothed rack 1 in isometric view. The toothed rack extends in a longitudinal direction 39 and comprises a wall 3, which encompasses the longitudinal axis 2 of the toothed rack 1. In a subregion 5 a toothing 6 with teeth 13 is impressed. The subregion 5 extends at least over the region of the toothing 6. Oriented to the tangential direction or circumferential direction 4, the subregion 5 is delimited by attenuations 7, 8, 9, 10, 11, 12, which extend in the circumferential direction spaced apart by a distance 24 or 24' on both sides next to the toothing 6. These attenuations 7-12 extend in the longitudinal direction 39 of the toothed rack, thus parallel to the longitudinal axis 2, and have a length 25 which corresponds approximately to the length of the toothed section 6. As clearly recognizable in the section depiction (FIG. 6, 12), the wall thickness of wall 3 is thinner at the attenuation sites 7, 8, 9, 10, 11, 12 compared to the starting wall thickness or the wall thickness in the surrounding. In the embodiment example the teeth extend in straight lines and at an angle of $\alpha=90°$ with respect to the longitudinal axis 2 as well as also to the direction of attenuation sites 7, 8, 9, 10, 11, 12 (see FIG. 10). The invention, however, also includes toothings of a different type, in which, for example, the angle of the tooth direction with respect to the longitudinal direction 2 is in the range between 30 and 90°. The toothings can also be formed arbitrarily, for example, as screw-shaped toothing or as toothing with variable pitch.

In the depicted embodiment on the outer surface 15 and on the inner surface 14 attenuations 7-12 are formed. It is also conceivable and feasible to provide attenuations only on the outer surface 15 or only on the inner surface 14 of the wall 3.

Figure 9:
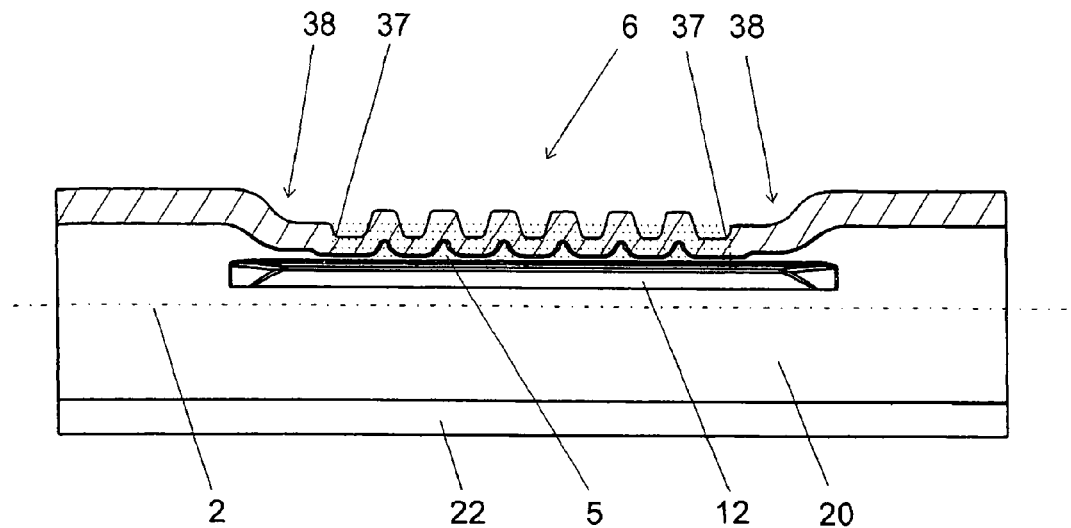
FIG. 9 shows an embodiment of the toothed rack according to the invention, according to FIG. 1 in longitudinal section.
Figure 10:
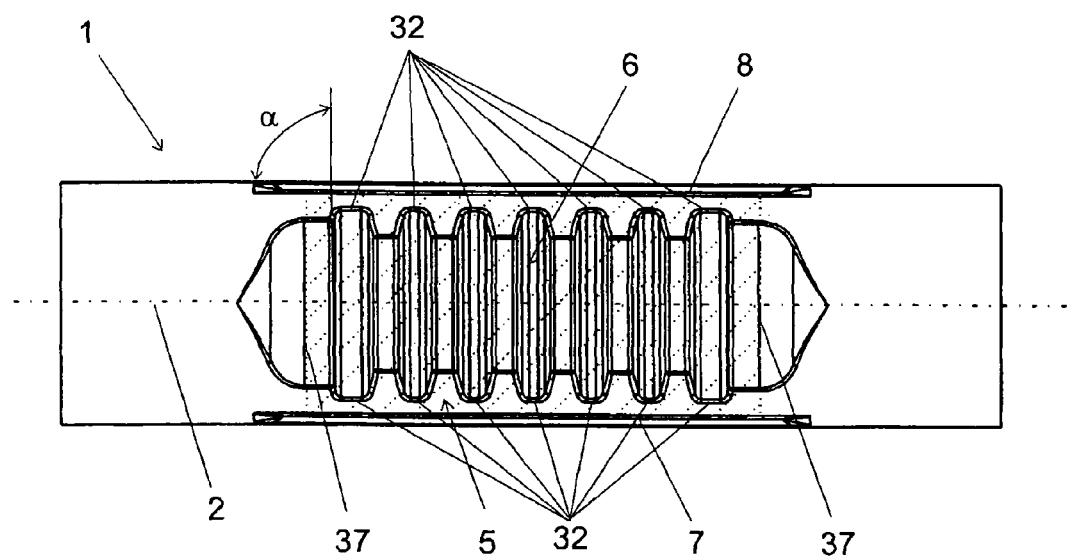
FIG. 10 shows a segment of the toothed rack according to the invention, according to the embodiment of FIG. 1 in top view onto the toothing side of the toothed rack.

In FIGS. 9 and 10, the embodiment of the toothed rack 1 according to the invention is illustrated in longitudinal section (FIG. 9) and in top view onto the toothing (FIG. 10). FIG. 10 shows especially clearly preferably at least one, preferably two, local attenuation(s) 7, 8 and/or holding edge(s) in the top view onto the toothing 6 of the (finished) toothed rack 1. In particular, in conjunction with FIGS. 9 and 10 is evident that in the example the subregion 5 in the longitudinal direction 2 is additionally delimited through the holding edges 37, and curvatures 38, which also serve as holding edges. As can be seen in the example, the delimitation does not need to be carried out through the attenuation sites and/or holding edges without discontinuity. It is readily conceivable and feasible to provide gaps in the sections of the attenuations and/or holding edges. While the boundary of the subregion 5, into which the toothing 6 is worked, in the longitudinal direction increases the quality, however, due to the direction of the toothing and the forming steps necessary in the fabrication process, it is not absolutely required, since by this path only a small proportion of stresses is introduced into the subregion 5 from the outside.

Figure 12:
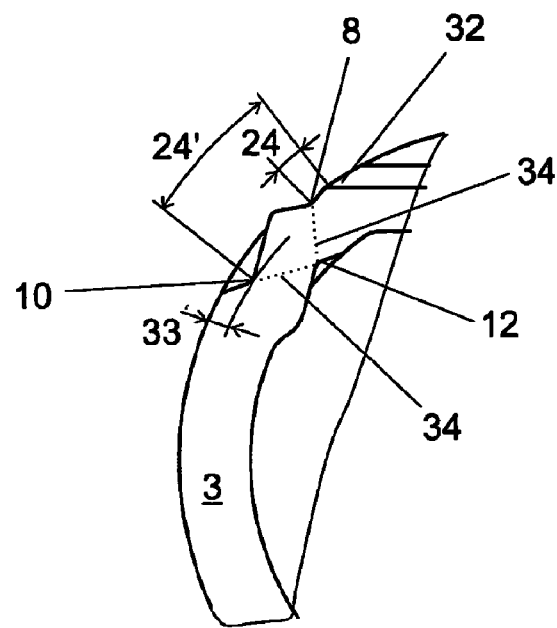
FIG. 12 shows segment Z from FIG. 6.

Through the bending of the workpiece transversely to the longitudinal direction 2, the major portion of the stresses is introduced in the circumferential direction 4 into the workpiece. The attenuations 7-12, which delimit the subregion 5 referred to the circumferential direction 4, are therefore provided in order to reduce the transmission of the stresses into the subregion 5. It is herein preferred if the length 25 of the attenuations 7-12 corresponds at least to the length of the subregion 5, thus at least to the length of the toothing 6, measured in the longitudinal direction 2. It is herein entirely feasible to form the attenuations 7, 8, 9, 10, 11, 12 with discontinuities along their length. Preferred is the formation of the attenuation as an impressed, continuous groove, wherein its length 25 corresponds to the length of the subregion 5 or the toothing 6 in the longitudinal direction 2 or projects beyond this by up to 5% on both sides. The depth 33 of the impressed groove in the preferred case is ¼ to ⅓ of the wall thickness of wall 3 (see in this connection also FIG. 12). For the case that on the inner surface 14 as well as also on the outer surface 15 of wall 3 impressions are provided as attenuations, the depth of the groove can still be further reduced. The depth 33 is in this case preferably at least ⅙ of the wall thickness of wall 3. Impression depths greater than one half of the wall thickness should be avoided. Alternatively, on these longitudinal sides of the subregion 5 the use of holding edges is also conceivable and feasible, wherein it remains to note that the impressed grooves depicted in the example, in addition to the effect, already act also as holding edges if the grooves in the succeeding forming are in contact with the die.

The distance 24, 24' of the center lines of the attenuation and/or holding edges 7, 8, 9, 10, 11, 12 from the runout 32 of the toothing 6 in the circumferential direction 4 is herein in the preferred case at least ⅓ of the wall thickness of wall 3. In the case that two parallel extending attenuations and/or holding edges 7, 8, 9, 10 are provided on each side of the toothing in the outer surface 15 of the wall 3, the distance 24 from the tooth runout 32 up to the first attenuation and/or holding edge in the circumferential direction 4 in the preferred case is approximately in the range of ⅓ of the value of the wall thickness of wall 3 up to the entire value of the wall thickness of wall 3. The distance 24' from the tooth runout 32 up to the second attenuation and/or holding edge in the circumferential direction 4 is in the preferred case approximately in the range of ⅔ of the value of the wall thickness of wall 3 up to the twofold value of the wall thickness of wall 3. If, in addition, still further attenuations 11, 12 are provided on the inner surface 14 of wall 3 on both sides of the toothing, these are preferably disposed in the circumferential direction 4 between the two outer attenuations and/or holding edges 7, 8, 9, 10.

The number of attenuation sites and/or holding edges and their position on the inner surface 14 or outer surface 15 of wall 3 must be determined depending on the wall thickness of wall 3 and the forming steps. A disposition of holding edges only on the outer surface 15 of the wall 3 is to be preferred since only during the first forming stages is it possible in simple manner to attain a die contact between holding edge and die engraving. The toothed rack 1 preferably includes at least one welding seam 35 preferably extending in the longitudinal direction 39 of the toothed rack 1. Depending on the position of the welding seam 35 in the circumferential direction, it can even suffice to provide only a single attenuation and/or holding edge. Since, as a rule, however, the toothed rack must withstand very high loadings, the wall thickness of wall 3 must, as a rule, be relatively thick. Accordingly, on each side of the subregion preferably three attenuations, two on the outer surface 15 and one on the inner surface 14 of wall 3, are worked into the workpiece. The two attenuations 7, 8 on the outer surface 15, which are disposed most closely to the subregion, are herein simultaneously laid out as holding edges. The geometric formation of the attenuations is preferably developed such that a removal of the workpiece after the forming of the toothing is not hindered by the undercut.

Attenuations and/or holding edges, which delimit the subregion 5 in the circumferential direction 4, can also extend at angles to the longitudinal direction 39, preferably at an angle of less than 45° to the longitudinal direction 39.

The main steps of the process sequence for the production of the toothed rack from a planar metal sheet 16 is illustrated in the FIGS. 2, 3, 4, 5 and 6 by example.

Figure 3:
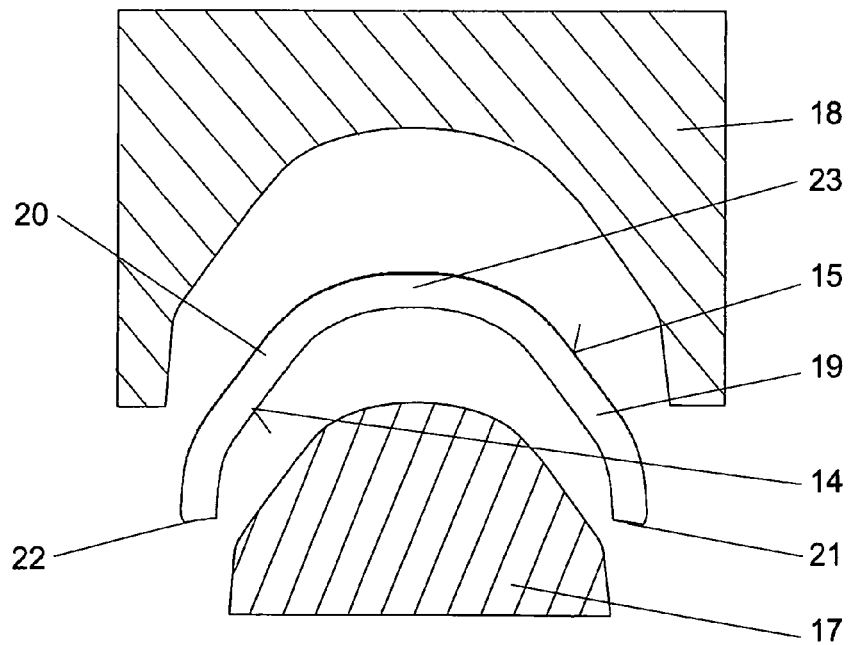
FIG. 3 shows a first forming stage for the formation of the toothed rack, shown in cross section.
Figure 7:
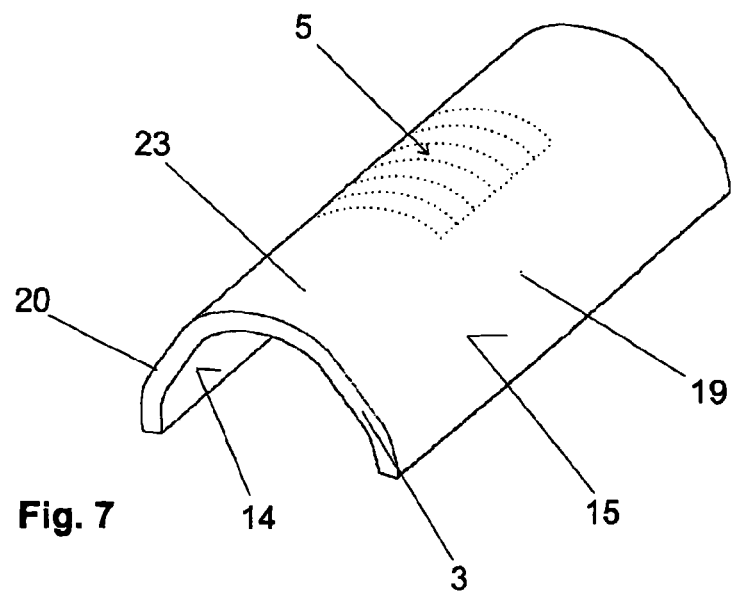
FIG. 7 shows the semifinished toothed rack, accordingly after the forming step corresponding to FIG. 3, in isometric view.

In a first step (FIG. 3) the planar metal sheet is formed in a forming die comprised of male die 17 and female die 18, into a half-shell-shaped or U-shaped form comprising two shanks 19, 20 with two ends 21, 22 and a connection section 23 disposed between the two shanks 19, 20. In the preferred case the two shanks 19, 20 are not directed parallel with respect to one another, but rather opening in the direction away from the connection section 23. After the forming, the wall 3 of the workpiece has a concave surface (=inner surface 14) and a convex surface (=outer surface 15). To improve the formation of a circular end form of toothed rack 1, the end pieces of the two shanks 19, 20 after the forming are minimally angled off such that the planes on which are located the two shank ends 20, 21 intersect within the volume partially enclosed by the connection section 23 and by the shanks 19, 20. It is here insignificant whether the angling-off of the two shank ends 20, 21 has taken place in a preceding forming step or is integrated into this first step, as is illustrated in FIG. 3. In FIG. 7 the workpiece after the first forming step is illustrated in isometric representation. The subregion 5, into which in the following forming steps the toothing 6 is worked in, is characterized by the dashed lines.

Through the orientation of the shanks 19, 20 good accessibility of forming dies for the subsequent forming operations is ensured.

Figure 4:
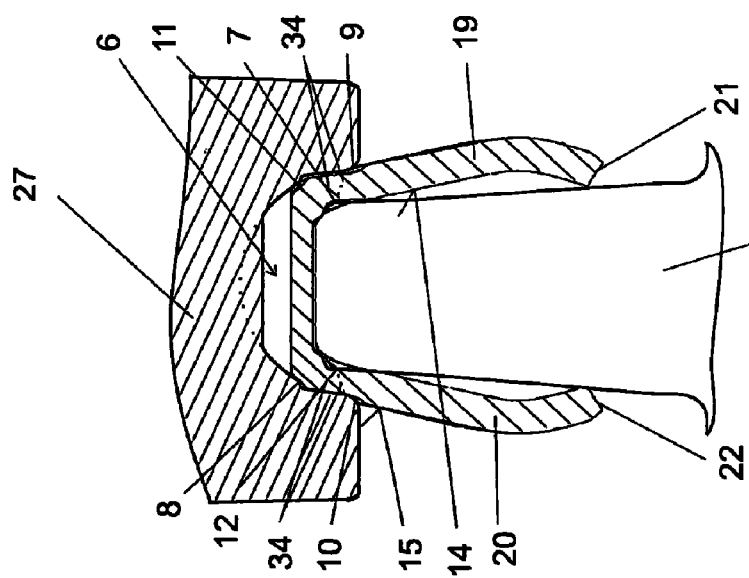
FIG. 4 shows a second forming stage for the formation of the toothed rack, shown in cross section.

FIG. 4 illustrates a second and third forming step for working in the attenuations 7-12 and the toothing 6. In the preferred process sequence the second and third forming step takes place, combined in one forming step, simultaneously in a forming die. In this forming step in a further forming die comprised of male die 26 and female die 27, the attenuations 7, 8, 9, 10 are pressed on the outer surface of wall 3, the attenuations 11, 12 on the inner side of wall 3 and the toothing 6 into the structural part. Preferred is consequently that the toothing 6 be impressed into the toothed rack 1. The opened non-parallel orientation of the two shanks 19, 20 facilitates the running-in of the male die 26 onto the inner surface 14 which, on the one hand, facilitates forming out the toothing and, on the other hand, permits forming in the attenuations 11, 12 on the inner surface 14 of wall 3. After the forming, in particular the male die 26 can be retracted from the workpiece without damaging the inner surface 14 and the shank ends 21, 22. In the female die 27 at least the corresponding negative contours for the attenuations and the toothing 6 are formed out. The inner surface in the proximity of the toothing 6 is herein laid out according to viewpoints of forming technology such that the toothing 6 is developed in the best possible quality. As a measure of the quality serves herein in particular the form discrepancy and the intrinsic stresses in the workpiece. An example thereof is the inner contour in the proximity of the toothing 6, as is depicted in FIG. 9.

To develop at least one attenuation 11, 12 on the inner surface 14 of the wall 3 (in the embodiment example there are two attenuations 11, 12) in the male die 26 appropriate form elements, such as edges, can be provided. At least one of these form elements, preferably all, is disposed at a spacing from the toothing when viewed in the circumferential direction, thus is not located beneath the same.

Figure 11:
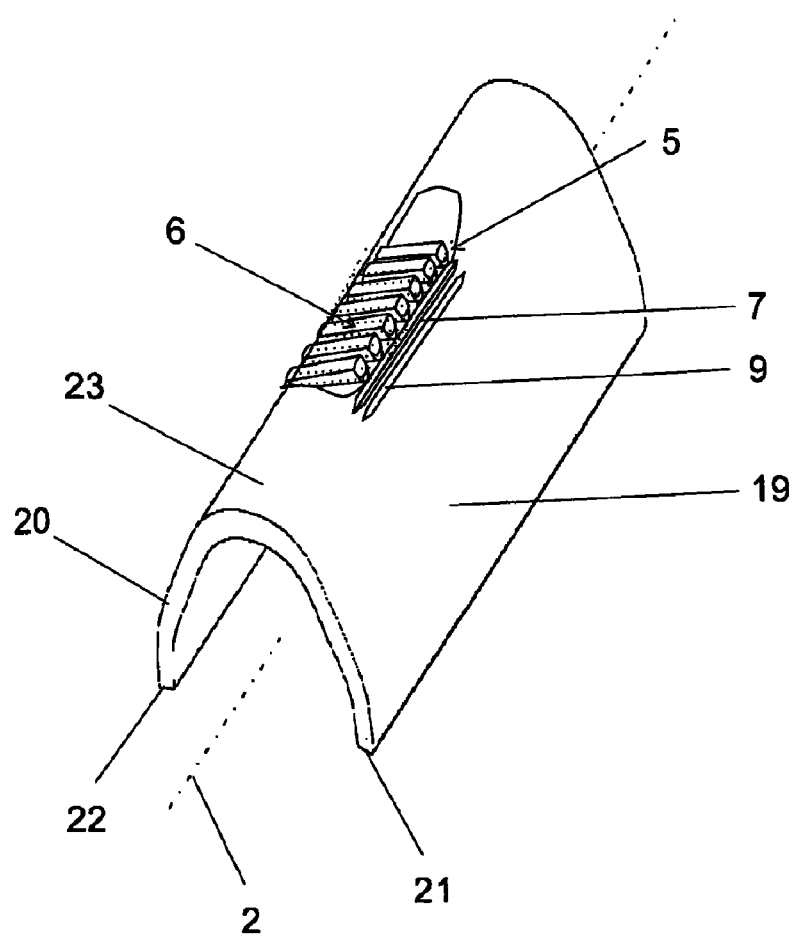
FIG. 11 shows the semifinished toothed rack, after the forming step according to FIG. 4 in isometric view.

In FIG. 11 the formed workpiece, according to the same intermediate stage of the forming sequence, as illustrated in FIG. 4, is shown in isometric representation. The attenuations 7, 9 delimit the subregion 5 into which the toothing 6 is worked.

Figure 8:
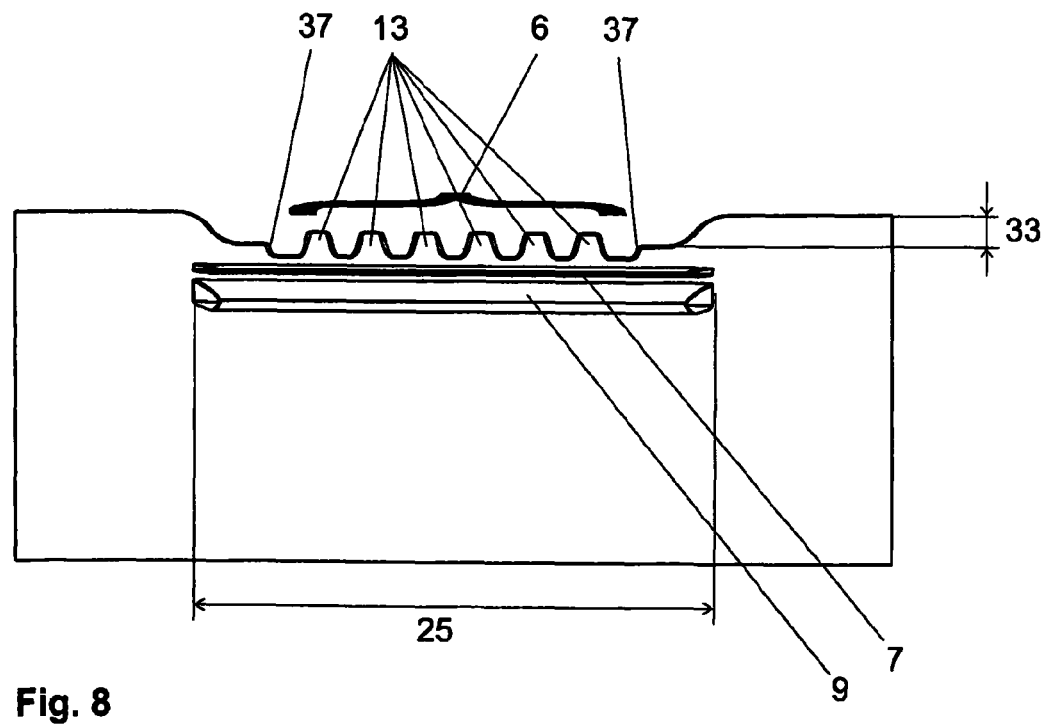
FIG. 8 shows the semifinished toothed rack after the impressing of the toothing and the attenuations, corresponding to FIG. 4 in side view.

FIG. 8 shows the workpiece after the completed second and third forming step in side view.

It is conceivable and feasible to break down the second and third forming step, combined in the embodiment example, into two or more substeps, in which first the attenuation and subsequently the toothing is formed in. Alternatively, the toothing can be worked into the workpiece and subsequently the attenuation. It is equally conceivable and feasible to work some of the attenuations into the workpiece in a first step and following thereon the toothing and adjoining thereon the remaining attenuations. Alternatively, fewer attenuations can also be worked into the workpiece. The attenuations can also be produced using means other than pressing. The attenuations can, for example, also be worked in through a rolling or milling method.

In the next forming step (FIG. 5) the two shanks 19, 20 are further closed. For this purpose the workpiece is placed between the forming dies 29, 30, which are closed appropriately for the forming. It is herein important that the upper die 29 has at least the negative contour of the toothing. In the course of the forming, facilitated bending takes place along the bending lines 34 which are formed by the attenuations 7, 8, 9, 10, 11, 12 in wall 3 of the workpiece. The forming stresses which lead to the forming of the two shanks can in this manner effect a plastic form change to a very slight degree or not at all in the proximity of the toothing 6. Minor residuals of the forming stresses are supported through the friction in the forming die 29 which bears the negative contour of the toothing. Thereby a further forming of the toothing can be largely avoided.

FIG. 6 illustrates the last forming step, in which the two shanks 19, 20 are formed into the final form of the toothed rack 1. Apart from a possible small elastic recovery after the completed forming, the two shank ends 21, 22 are in contact with one another, which contact, due to the angling-off preferably developed in the first forming step, is nearly over the entire area. The shank ends 21, 22 can subsequently be connected with one another preferably using welding techniques (not shown here). In addition to the joining of the two shank ends, the final forming-out of the two shanks 19, 20 into a circular section form also takes place in the last forming step. In this step the bending lines 34 formed through the attenuation also reduce the penetration of the forming stresses into the proximity of the toothing. In this step the negative contour of the toothing is also developed in the upper die 31. Moreover, in the upper die 31 and the lower die 30 the negative contour of the finished toothed rack is substantially developed. The restriction relates essentially to a potential discrepancy from the final contour for the correction of potentially present elastic recovery and/or appropriate material addition for subsequent mechanical working of the toothed rack.

It is evident that in this bending-together a die contact on the inner surface 14 of wall 3 of the toothed rack 1 in the proximity of the toothing 6 is no longer simply possible and is also not carried out in the depicted embodiment example.

As shown in the example, the face of the toothing 6 directed away from the longitudinal axis 2 is in contact on the die engraving during the forming steps after the toothing 6 has been worked in, until the ends 21, 22 of the side shanks 19, 20 are bent together. However, for reasons of fabrication sequence it can be necessary not to maintain this die contact in all of the following forming steps. However, this entails disadvantages and this process sequence should therefore as much as possible be avoided, even if it is also included in the scope of the invention.

It is evident that said two forming steps illustrated in FIGS. 5 and 6 can also be combined in a single forming step. In this case this single forming step would be the fourth forming step or the third forming step if said second and third forming steps, as stated, are combined into a single forming step.

The breakdown or combining of the above forming steps described above in detail follows techniques of methods planning known to the person of skill in the art. The goal herein is always to combine as many forming steps as possible and to carry them out in one process step in one die.

An example of a method according to the invention is characterized in that it comprises at least the following steps:
- in a first fabrication step the planar metal sheet is formed in a first forming die 17, 18 into a half-shell form or U-form, comprising two shanks 19, 20 with two ends 21, 22, which, opposite the ends 21, 22, are connected with one another by a connection section 23,
- in a second forming step one or several attenuations 7, 8, 9, 10, 11, 12 and/or holding edges which are formed in, spaced apart in the tangential direction 4 from the subregion 5 of wall 3, which [subregion] is located in a region of the connection section 23, extending in the longitudinal direction 2 at least along a portion of the length 25 of subregion 5,
- in a third forming step the toothing 6 is pressed into the subregion 5 and subsequently
- in one or several subsequent forming steps the ends 21, 22 of the two shanks 19, 20 are bent together under the formation of a hollow volume extending in the direction of the longitudinal axis.

A further example of a method according to the invention is characterized in that it comprises at least the following steps:
- in a first fabrication step the planar metal sheet in a first forming die 17, 18 is formed into a half-shell form or a U-form, comprising two shanks 19, 20 with two ends 21, 22, which, opposite the ends 21, 22, are connected with one another by a connection section 23,
- in a second forming step the toothing 6 is pressed into the subregion 5, and
- in a third forming step one or several attenuations 7, 8, 9, 10, 11, 12 and/or holding edges are formed in, spaced apart in the tangential direction from the subregion of wall 3, which subregion is located in a region of the connection section 23, extending in the longitudinal direction 2 at least along a portion of the length 25 of the subregion 5, and subsequently
- in one or several succeeding forming steps the ends 21, 22 of the two shanks 19, 20 are bent together under the formation of a hollow volume extending in the direction of the longitudinal axis.

Forming out the toothing and generating the attenuations or holding edges can in this embodiment example be carried out together in one single forming step in one forming die.

A further example of a method according to the invention is characterized in that it comprises at least the following steps:
- in a first step one or several attenuations 7, 8, 9, 10, 11, 12 and/or holding edges, which delimit a subregion 5 of the planar metal sheet 16, are worked in,
- in a further fabrication step the planar metal sheet in a first forming die 17, 18 is formed into a half-shell form or a U-form, comprising two shanks 19, 20 with two ends 21, 22, which opposite ends 21, 22 are connected with one another by a connection section 23,
- in a further forming step taking place before the formation of the U-form, after the formation of the U-form or together with the formation of the U-form, the toothing 6 is pressed into the subregion 5, and subsequently
- in one or several subsequent forming steps the ends 21, 22 of the two shanks 19, 20 are bent together under the formation of a hollow volume extending in the direction of the longitudinal axis.

The attenuations are developed in the examples illustrated in the Figures as impressed grooves. It is alternatively conceivable and feasible to lay out the attenuations as beads which can be rolled or pressed. The attenuations and/or holding edges can as well be generated using a machining method, for example milling. However, it is also conceivable and feasible to lay out the attenuations as perforations. Further, regions of the workpiece can also be soft-annealed in order to obtain such an attenuation.

In an alternative embodiment of the invention the attenuations and/or holding edges are already worked into the starting workpiece, the planar metal sheet 16. This can take place in simple manner through a stamping operation simultaneously with the cutting of the piece of metal sheet 16 from a coil. It is even conceivable and feasible to work in the attenuations and/or holding edges already during the rolling of the sheet metal strip from which the sheet metal pieces 16 are punched. In the course of the remaining steps of the process sequence, accordingly, no additional attenuations and/or holding edges need in this case be worked in.

A toothed rack according to the invention can overall be hollow or it can comprise a hollow section, such as is depicted for example in FIG. 1, on which on one side or both sides further, for example solid parts are disposed, for example are welded on.

Apart from the depicted, substantially (except for the toothing region) annular cross section contour, the hollow section of the toothing can also have different cross sectional contours, for example, a square or triangular cross sectional contour.

It would also be conceivable and feasible to provide several subregions 5 on the toothed rack 1, which are developed at different positions in the circumferential direction 4 and/or at different positions in the longitudinal direction 39 in wall 3 of the toothed rack 1, wherein the subregions 5 according to the invention are delimited by attenuations and/or holding edges. The different subregions 5 can herein include toothings 6 and/or other form elements, such as for example functional faces for the bearing support of the toothed rack in the pressure piece of the steering system.

The invention claimed is:

1. A method for the production of a hollow section of a toothed rack or a hollow toothed rack from a planar metal sheet, wherein a longitudinal axis of the hollow section of the toothed rack extends parallel to a longitudinal direction and the hollow section of the toothed rack comprises a wall which encompasses the longitudinal axis of the toothed rack in a circumferential direction and in at least one subregion is comprised a toothing, said method comprising:
   fabricating the planar metal sheet in a first forming die into one of a half-shell form and a U-form comprising two shanks with two ends connected with one another by a connection section,
   subsequently, simultaneously or before said fabricating the planar metal sheet, fabricating the toothing by pressing at least one tooth into the metal sheet, and
   after said fabricating the planar metal sheet in the first forming die into one of the half-shell form and the U-form, bending, in at least one step, the ends of the two shanks together under the formation of a hollow volume extending in a direction of the longitudinal axis,
   wherein into the metal sheet, at least one attenuation or holding edge or at least one attenuation and holding edge are formed at least on an outer surface of the wall spaced apart in the circumferential direction from the already worked-in, or still to be worked in, toothing, and, with reference to the longitudinal direction of the toothed rack, when the toothing is formed the attenuations extend along at least a portion of the length of the toothing, and wherein the at least one attenuation or holding edge or the at least one attenuation and holding edge counteracts an uncontrolled shape deformation of the toothing.

2. The method as claimed in claim 1, wherein the at least one attenuation or holding edge or the at least one attenuation and holding edge are formed before at least one step in said bending the ends of the two shanks together under the formation of the hollow volume extending in the direction of the longitudinal axis, and are formed simultaneously with said fabricating the toothing or before said fabricating the toothing.

3. The method as claimed in claim 1, wherein the at least one attenuation or holding edge or the at least one attenuation and holding edge are formed after said fabricating the toothing and before at least one step in said bending the ends of the two shanks together under the formation of the hollow volume extending in the direction of the longitudinal axis.

4. The method as claimed in claim 1, wherein the at least one attenuation or holding edge are formed into the planar metal sheet.

5. The method as claimed in claim 1, wherein following the toothing being worked in and before at least one step in said bending the ends of the side shanks together, the toothing and the attenuation or the holding edge disposed on the outer surface are stayed in a female die of a forming die, at least on the face of the toothed rack facing away from the longitudinal axis.

6. The method as claimed in claim 1, further comprising after the completion of said fabricating the metal sheet, connecting the two ends of the shanks by welding.

7. The method as claimed in claim 1, wherein the at least one attenuation or holding edge or the at least one attenuation and holding edge are formed at least on an outer surface of the wall before said fabricating the toothing.

8. The method as claimed in claim 1, wherein the at least one attenuation or holding edge or the at least one attenuation and holding edge are formed so as to be discontinuous along a length thereof.

9. The method as claimed in claim 1, wherein the attenuation extends substantially along the entire length of the toothing when the toothing is formed.

* * * * *